United States Patent
Kim

(10) Patent No.: US 11,524,623 B2
(45) Date of Patent: Dec. 13, 2022

(54) INPUT LIGHTING SIGNAL OPTIMIZATION DEVICE AND METHOD

(71) Applicant: HYUNDAI MOBIS CO., LTD, Seoul (KR)

(72) Inventor: Myeong Je Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 40 days.

(21) Appl. No.: 16/952,344

(22) Filed: Nov. 19, 2020

(65) Prior Publication Data

US 2021/0276480 A1    Sep. 9, 2021

(30) Foreign Application Priority Data

Mar. 4, 2020 (KR) .......................... 10-2020-0027291

(51) Int. Cl.
*B60Q 1/14*     (2006.01)
*B60Q 1/34*     (2006.01)
*F21S 41/141*   (2018.01)
*F21S 43/14*    (2018.01)

(52) U.S. Cl.
CPC ........... *B60Q 1/1423* (2013.01); *B60Q 1/346* (2013.01); *F21S 41/141* (2018.01); *F21S 43/14* (2018.01); *B60Q 2300/05* (2013.01); *B60Q 2300/12* (2013.01); *B60Q 2300/142* (2013.01)

(58) Field of Classification Search
CPC .. B60Q 1/346; B60Q 2300/05; B60Q 1/1423; B60Q 2300/12; B60Q 2300/142
See application file for complete search history.

(56) References Cited

U.S. PATENT DOCUMENTS

| | | | |
|---|---|---|---|
| 10,766,409 B2 * | 9/2020 | Salter | F21S 43/247 |
| 10,940,790 B1 * | 3/2021 | Mazuir | F21V 14/04 |
| 2002/0101210 A1 * | 8/2002 | Boisvert | H02H 7/0851 |
| | | | 318/469 |
| 2004/0100373 A1 * | 5/2004 | Ponziani | B60Q 1/346 |
| | | | 340/476 |
| 2007/0091629 A1 * | 4/2007 | Fukawa | F21S 41/686 |
| | | | 362/509 |
| 2012/0299476 A1 * | 11/2012 | Roberts | B60Q 1/2607 |
| | | | 315/77 |
| 2017/0174120 A1 * | 6/2017 | Sassoon | F21S 41/143 |
| 2019/0017311 A1 | 1/2019 | McGettrick et al. | |
| 2021/0276480 A1 * | 9/2021 | Kim | B60Q 1/1423 |

FOREIGN PATENT DOCUMENTS

| | | |
|---|---|---|
| KR | 20-0152766 | 7/1999 |
| KR | 10-2008-0088249 | 10/2008 |
| KR | 10-2019-0080454 | 7/2019 |

\* cited by examiner

*Primary Examiner* — Jason Crawford
(74) *Attorney, Agent, or Firm* — H.C. Park & Associates, PLC

(57) ABSTRACT

An input lighting signal optimization device includes a multiplex circuit configured to select and output a first LED lamp lighting signal or a second LED lamp lighting signal, and a MICOM configured to output a driving signal for driving a first LED lamp or a second LED lamp after receiving an output signal of the multiplex circuit through one input port and detecting a wake-up signal included in the output signal of the multiplex circuit to switch to an activation mode.

16 Claims, 10 Drawing Sheets

INPUT LIGHTING SIGNAL OPTIMIZATION DEVICE AND METHOD

CROSS-REFERENCE TO RELATED APPLICATION

This application claims priority from and the benefit of Korean Patent Application No. 10-2020-0027291, filed on Mar. 4, 2020, which is hereby incorporated by reference for all purposes as if set forth herein.

BACKGROUND

Field

Exemplary embodiments relate to an input lighting signal optimization device and method, and more particularly, to an input lighting signal optimization device and method capable of reducing a material cost by processing a plurality of lighting signals even with a controller of a small package as a plurality of lighting signals to drive a vehicle lamp are optimized to reduce the number of input ports of the microcomputer (MICOM) controller.

Discussion of the Background

In general, various lamps necessary for driving are installed in a vehicle.

For example, low-beam lamps and a high-beam lamps are headlamps that project light forward to ensure a forward view during night driving, a Daytime Running Light (DRL) light that is a daytime headlight, a position lamp that is a vehicle width light, a Static Bending Light (SBL) lamp that is a smart cornering lamp, and a TURN lamp that is a turn signal.

In addition, after allocating pins (ports) for each lamp lighting signal to the MICOM to determine the signals inputted to each pin, various lamps can be turned on by DC/DC output suitable for the function of each lamp.

However, when allocating the pins of the MICOM for each lamp lighting signal, the number of pins of the MICOM was limited and the pin of the input terminal was insufficient. As the technology develops, the functions responsible for the MICOM increase, and as the pin utilization rate is gradually increasing, MICOM's pins are insufficient.

Therefore, in order to increase the MICOM's pins, it is necessary to use a product with a larger package, but there is a problem in that manufacturing cost increases.

The above information disclosed in this Background section is only for enhancement of understanding of the background of the invention and, therefore, it may contain information that does not constitute prior art.

The technical problems of the present invention are not limited to the technical problems mentioned above, and other technical problems not mentioned will be clearly understood by those skilled in the art from the following descriptions.

SUMMARY

Exemplary embodiments of the present invention provide an input lighting signal optimization device and method that can reduce manufacturing costs by optimizing a plurality of lighting signals to drive a vehicle lamp to reduce the number of input ports of a MICOM that is a controller and to process a plurality of lighting signals even with a small package MICOM.

An input lighting signal optimization device according to an embodiment of the present invention includes a multiplex circuit configured to select and output a first LED lamp lighting signal or a second LED lamp lighting signal; and a MICOM configured to output a driving signal to drive a first LED lamp or a second LED lamp after receiving an output signal of the multiplex circuit through one input port and detecting a wake-up signal included in the output signal of the multiplex circuit to switch to an activation mode.

In an embodiment, the multiplex circuit includes a voltage driver circuit that converts an input voltage to a desired output voltage using a resistor.

In an embodiment, the input port performs an ADC operation to convert an analog signal to a digital signal, wherein the MICOM detects an input voltage converted through the ADC operation and performs a function determined for each voltage level.

In an embodiment, if the output signal of the multiplex circuit is not inputted to the input port for a predetermined period of time, the MICOM operates in a power saving mode, and maintains the input port to be in an active state to detect the wake-up signal in the power saving mode.

In an embodiment, the first LED lamp lighting signal is inputted with a voltage higher than a wake-up threshold, and the second LED lamp lighting signal is inputted with a voltage lower than the wake-up threshold.

In an embodiment, the first LED lamp lighting signal includes a low beam lamp lighting signal, a vehicle width lamp lighting signal or a daytime headlight lamp lighting signal.

In an embodiment, the MICOM drives the low beam lamp, the vehicle width lamp or the daytime headlight lamp through the first LED lamp lighting signal.

In an embodiment, the second LED lamp lighting signal includes a high beam lamp lighting signal, a smart cornering lamp lighting signal or a turn indicator lamp lighting signal.

In an embodiment, the MICOM turns on the high beam lamp when the high beam lamp lighting signal is inputted while the low beam lamp is turned on, wherein the MICOM turns on the smart cornering lamp when the smart cornering lamp lighting signal is inputted while the vehicle width lamp is turned on, wherein the MICOM turns off the daytime headlight lamp and then turns on the turn indicator lamp when the turn indicator lamp lighting signal is inputted while the daytime headlight lamp is turned on.

An input lighting signal optimization method according to another embodiment of the present invention includes a power saving mode operation in which a MICOM receiving an output signal of a multiplex circuit selecting and outputting a first LED lamp lighting signal or a second LED lamp lighting signal through one input port operates in a power saving mode if the output signal is not inputted to the input port for a predetermined period of time, a wake-up operation of detecting a wake-up signal from the output signal inputted to the input port and operating in an activation mode, and a driving operation of outputting a driving signal to drive the first LED lamp or the second LED lamp as a function determined for each voltage level after recognizing a voltage level of the output signal inputted to the input port.

In an embodiment, the power saving mode operation includes maintaining the input port to be in an active state to detect the wake-up signal.

In an embodiment, the wake-up operation includes: inputting the first LED lamp lighting signal with a voltage higher than a wake-up threshold; and inputting the second LED lamp lighting signal with a voltage lower than the wake-up threshold.

In an embodiment, the driving operation includes: performing an ADC operation to convert an analog signal to a digital signal at the input port; and detecting, by the MICOM, the input voltage converted through the ADC operation and performing a function determined for each voltage level.

In an embodiment, the driving operation includes driving a low beam lamp, a vehicle width lamp or a daytime headlight lamp through the first LED lamp lighting signal.

In an embodiment, the driving operation includes: turning on the high beam lamp when the high beam lamp lighting signal is inputted while the low beam lamp is turned on; turning on the smart cornering lamp when the smart cornering lamp lighting signal is inputted while the vehicle width lamp is turned on; and turning off the daytime headlight lamp and then turning on the turn indicator lamp when the turn indicator lamp lighting signal is inputted while the daytime headlight lamp is turned on.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Figure 1:
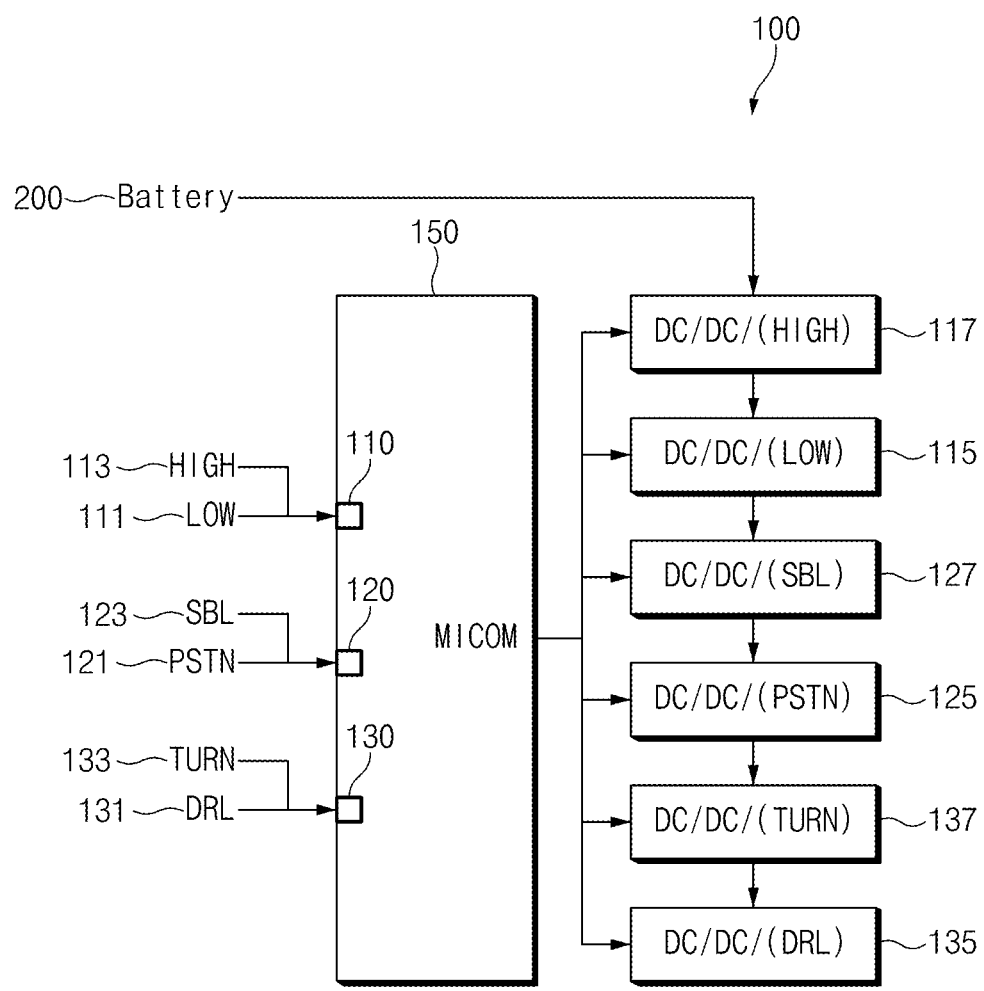
FIG. 1 is a block diagram illustrating an input lighting signal optimization device according to an embodiment of the present invention.

The invention is described more fully hereinafter with reference to the accompanying drawings, in which embodiments of the invention are illustrated. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Hereinafter, some embodiments of the present invention will be described in detail through exemplary drawings. It should be noted that, in assigning reference numerals to components of each drawing, although the components are displayed on different drawings, like reference numerals refer to like components. Additionally, in describing the inventive concept, detailed descriptions of well-known configurations or functions will be omitted if it is determined that they would obscure the subject matter of the inventive concept.

In describing the components of the embodiment of the present invention, terms such as first, second, A, B, (a), and (b) may be used. These terms are only to distinguish the components from other components, and the nature, sequence, or order of the components are not limited by the terms. Otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning.

Hereinafter, embodiments of the present invention will be described in detail with reference to FIGS. 1 to 6.

Figure 2:
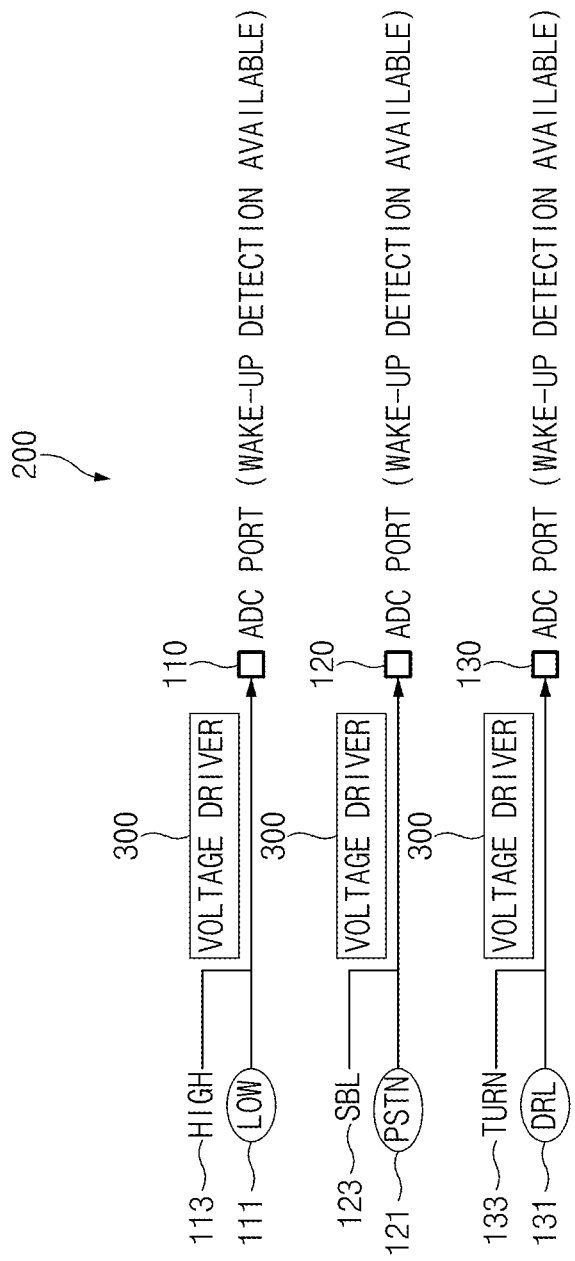
FIG. 2 is a block diagram illustrating an input terminal of an input lighting signal optimization device according to an embodiment of the present invention.
Figure 3:
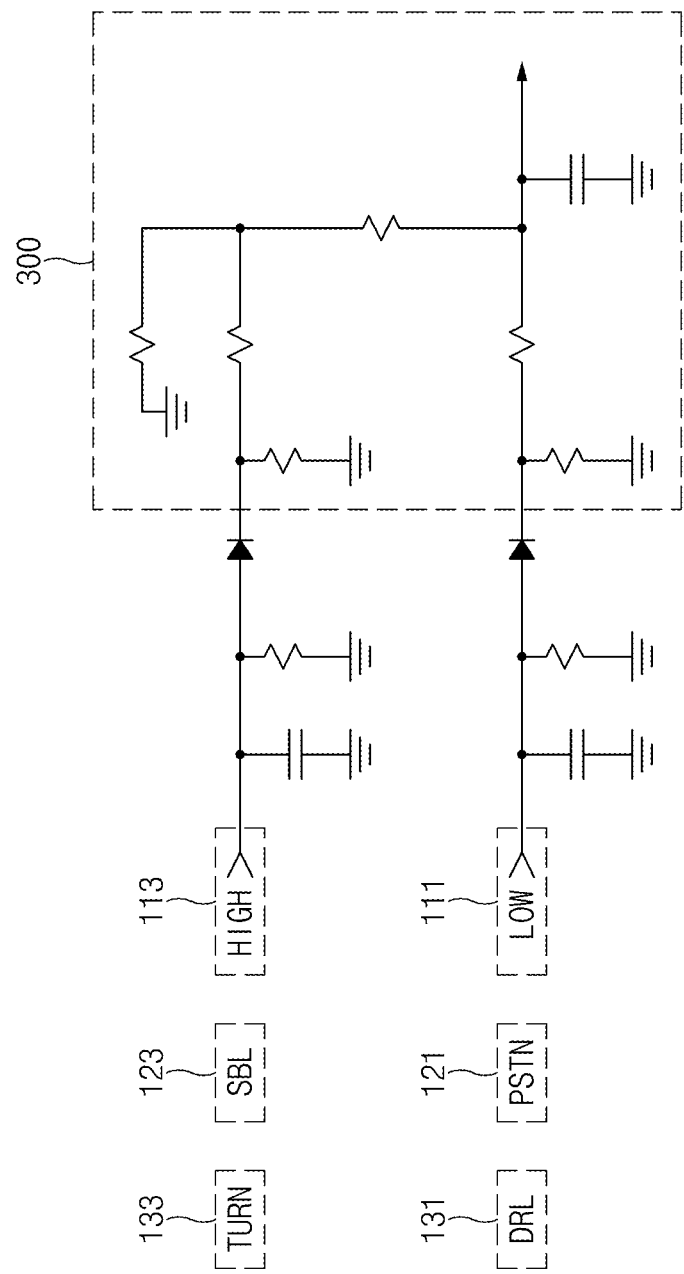
FIG. 3 is a circuit diagram illustrating an input terminal of an input lighting signal optimization device according to an embodiment of the present invention.
Figure 4:
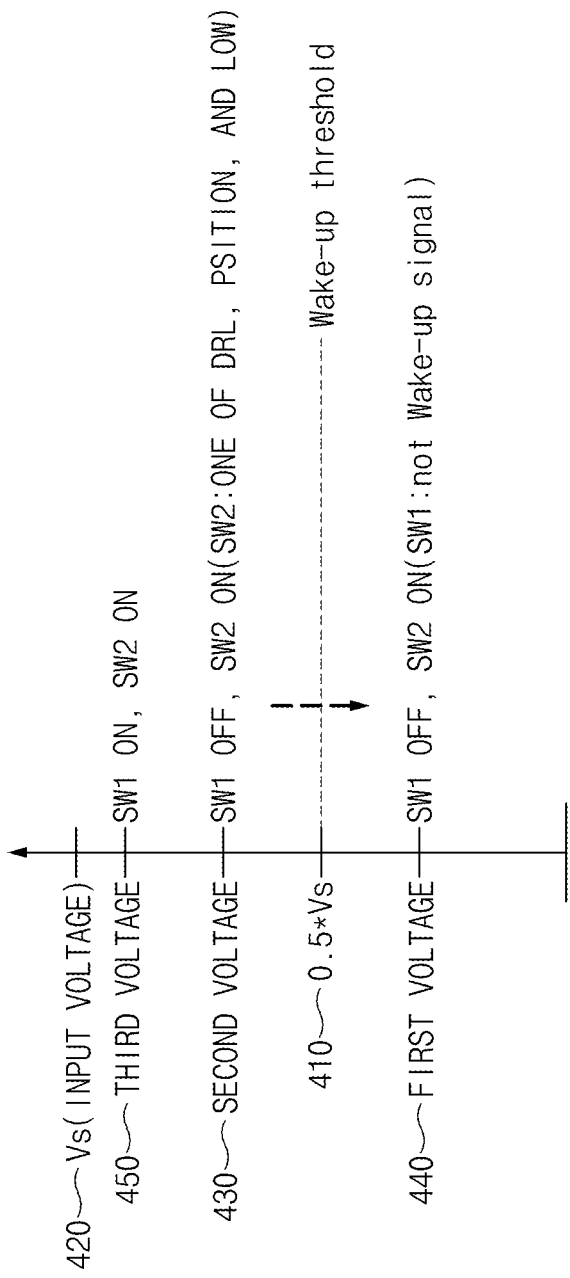
FIGS. 4, 5, and 6 are diagrams illustrating the signal input at the input terminal of the input lighting signal optimization device according to an embodiment of the present invention.
Figure 5:
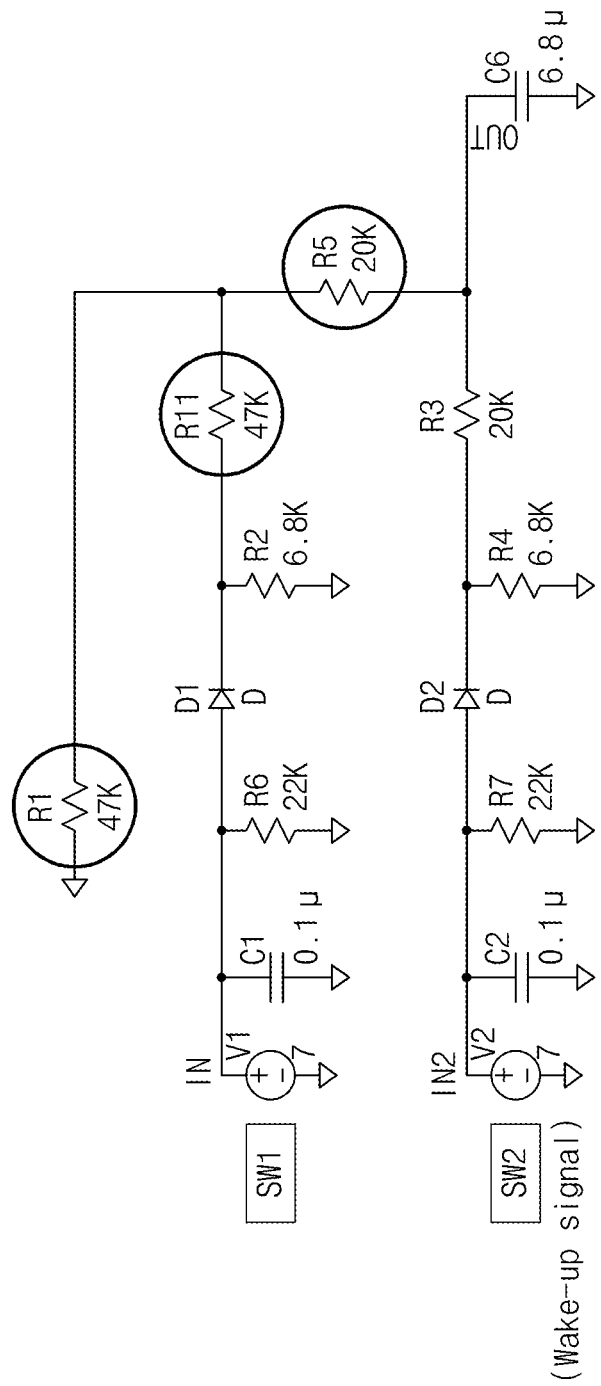
Figure 6:
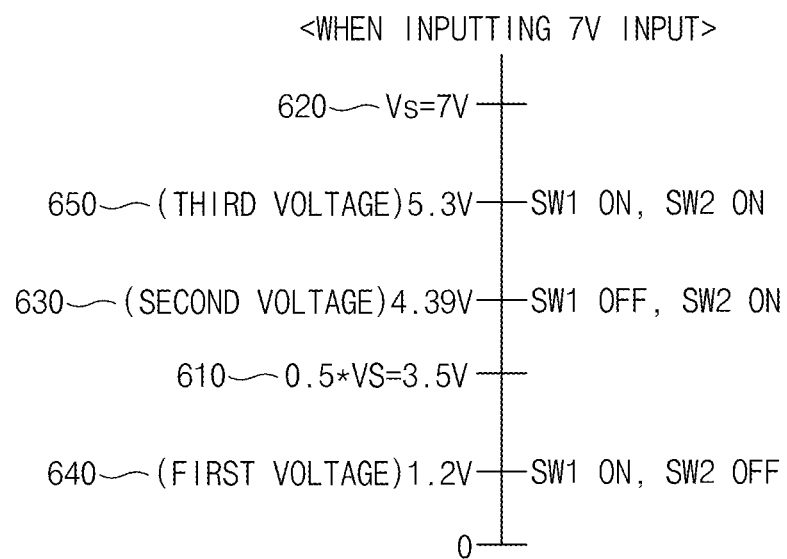

FIG. 1 is a block diagram illustrating an input lighting signal optimization device according to an embodiment of the present invention, FIG. 2 is a block diagram illustrating an input terminal of an input lighting signal optimization device according to an embodiment of the present invention, FIG. 3 is a circuit diagram illustrating the input terminal of an input lighting signal optimization device according to an embodiment of the present invention, and FIGS. 4 to 6 are diagrams illustrating the signal input at the input terminal of an input lighting signal optimization device according to an embodiment of the present invention.

Referring to FIG. 1, an input lighting signal optimization device 100 according to an embodiment of the present invention may be included in an LED driver module (LDM) mounted on a vehicle and may configured to include a plurality of multiplex circuits configured to select and output a first LED lamp lighting signal or a second LED lamp lighting signal, and a MICOM 150150 that receives an output signal of one of the multiplex circuits through one input port (or input pin).

FIG. 2 illustrates a plurality of multiplex circuits 200 according to the present invention. The multiplex circuits 200 are configured to select and output one signal from two input signals, and referring to FIGS. 2 and 3, each of the multiplex circuits 200 may include a voltage driver circuit 300 that converts an input voltage to a desired output voltage using a resistor. Each of the multiplexer circuits 200 may have dual inputs and a single output.

The input signals of the multiplex circuits 200, for example, may include different signals such as a low beam lamp lighting signal 111 as a first LED lamp lighting signal and a high beam lamp lighting signal 113 as a second LED lamp lighting signal, as one multiplex input signal. One of multiplex circuits 200 may use a vehicle width light lamp (POSITION) lighting signal 121 as a first LED lamp lighting signal and a smart cornering lamp (SBL) lighting signal 123 as a second LED lamp lighting signal, as one multiplex input signal. Another of the multiplex circuits 200 may use a daytime headlight lamp (DRL) lighting signal 131 as a first LED lamp lighting signal and a turn indicator (TURN) lamp lighting signal (133) as a second LED lamp lighting signal, as one multiplex input signal.

The MICOM 15150 may include a first input port 110 to which the output of the multiplex circuit using the low beam lamp lighting signal 111 and the high beam lamp lighting signal 113 as input signals is connected, a second input port 120 to which the output of the multiplex circuit using the vehicle width light lamp lighting signal 121 and the smart cornering lamp lighting signal 123 as input signals is connected, and a third input port 130 to which the output of the multiplex circuit using the daytime headlight lamp lighting signal 131 and the turn indicator lamp lighting signal 133 as input signals is connected.

In this way, because two lighting signals can be connected to one input port, the number of input ports of the MICOM 150 can be reduced.

The first input port 110, the second input port 120, and the third input port 130 are configured to perform ADC operations and convert analog signals to digital signals. The MICOM 150 can detect a converted input voltage through an ADC operation and perform a predetermined function for each voltage level.

If the output signal of the multiplex circuit 200 is not inputted to the first input port 110, the second input port 120 or the third input port 130 for a predetermined period of time, the MICOM 150 may operate in a power saving mode to reduce power of a battery 250.

Subsequently, when detecting a wake-up signal included in an output signal of the multiplex circuit 200, the MICOM 150 may switch from the power saving mode to an activation mode in order to drive the lamp of the vehicle corresponding to the input lighting signal.

The MICOM 150 maintains the first input port 110, the second input port 120, or the third input port 130, which can detect the wake-up signal in the power saving mode, to be in an active state, and maintains the remaining ports to be in inactive state.

Therefore, the output of the multiplex circuit 200 should be connected to the first input port 110, the second input port 120, or the third input port 130 capable of detecting a wake-up signal so that the MICOM 150 can operate even in the power saving mode.

Referring to FIG. 4, a wake-up threshold 410 may correspond to 50% of the input voltage 420 Vs supplied from the battery 250, and in order to detect the wake-up signal in sleep mode, a voltage higher than the wake-up threshold should be input to the first input port 110, the second input port 120, or the third input port 130.

In the present invention, the low beam lamp lighting signal 111, the vehicle width light lamp lighting signal 121, and the daytime headlight lamp lighting signal 131 are generated at a second voltage 430 higher than the wake-up threshold 410 so that the MICOM 150 can detect the wake-up signal.

Accordingly, in the power saving mode, only with the input of the low beam lamp lighting signal 111, the vehicle width lamp lighting signal 121 or the daytime headlight lamp lighting signal 131, the MICOM 150 operates in the activation mode so that the low beam lamp 115, the vehicle width lamp 125, or the daytime headlight lamp 135 may be turned on.

Meanwhile, the high beam lamp lighting signal 113, the smart cornering lamp lighting signal 123, and the turn indicator lamp lighting signal 133 may be generated at a first voltage 440 lower than the wake-up threshold.

Even if the high beam lamp lighting signal 113, the smart cornering lamp lighting signal 123, or the turn indicator lamp lighting signal 133 is inputted in the power saving mode, the MICOM 150 cannot detect the wake-up signal with the first voltage lower 440 than the wake-up threshold 410, thereby maintaining the power saving mode.

Accordingly, when the low beam lamp lighting signal 111 is inputted, the MICOM 150 is switched from the power saving mode to the activation mode, and accordingly, when the high beam lamp lighting signal 113 is inputted while the low beam lamp 117 is turned on, the MICOM 150 turns on the high beam lamp 117.

At this time, the input voltage inputted to the MICOM 150 is the third voltage 450, which is the sum of the first voltage 440 and the second voltage 430, and may still be in the activation mode.

When the vehicle width lamp lighting signal 121 is inputted, the MICOM 150 is switched from the power saving mode to the activation mode, and accordingly, when the smart cornering lamp lighting signal 123 is inputted while the vehicle width lamp 125 is turned on, the MICOM 150 may turn on the smart cornering lamp 127.

At this time, the input voltage inputted to the MICOM 150 is the third voltage 450, which is the sum of the first voltage 440 and the second voltage 430, and may still be in the activation mode.

When the daytime headlight lamp lighting signal 131 is inputted, the MICOM 150 is switched from the power saving mode to the activation mode, and accordingly, when the turn signal lamp 133 is inputted while the daytime headlight lamp 135 is turned on, the MICOM 150 may turn on the turn indicator lamp 137.

Meanwhile, when the turn indicator lamp 137 is turned on, the daytime headlight lamp 135 may be turned off. Therefore, in relation to the input voltage to the MICOM 150, only the first voltage 440 is inputted to the MICOM 150 so that it can be switched to the power saving mode. However, because the daytime headlight lamp lighting signal 135 is turned off, if the daytime headlight lamp lighting signal 135 is inputted to the MICOM 150 again, it can be switched to the activation mode, so the operation of the MICOM 150 is not affected.

Referring to FIGS. 5 and 6, the input SW2 may be a low beam lamp lighting signal 111, a vehicle width lamp lighting signal 121 or a daytime headlight lamp lighting signal 131, and the input SW1 may be a high beam lamp lighting signal 113, a smart cornering lamp lighting signal 123, and a turn indicator lamp lighting signal 133.

The input voltage 620 Vs is a battery voltage, and in this embodiment, the input voltage 620 is 7V, but is not limited thereto. The input voltage may be changed by charging and discharging, and the operating voltage range may be changed in proportion to the voltage change.

The low beam lamp lighting signal 111, the vehicle width lamp lighting signal 121 or the daytime headlight lamp lighting signal 131 is generated at 4.39 V, which is a second voltage 630, higher than 3.5 V, which is a wake-up threshold, the MICOM 150 can detect the wake-up signal.

In the power saving mode, only with the input of the low beam lamp lighting signal 111, the vehicle width lamp lighting signal 121 or the daytime headlight lamp lighting signal 131, the MICOM 150 operates in the activation mode so that the low beam lamp 115, the vehicle width lamp 125, or the daytime headlight lamp 135 may be turned on.

The high beam lamp lighting signal 113, the smart cornering lamp lighting signal 123, or the turn indicator lamp lighting signal 133 may be generated at 1.2 V, which is a first voltage 640, lower than 3.5 V, which is the wake-up threshold 610.

Even if the high beam lamp lighting signal 113, the smart cornering lamp lighting signal 123, or the turn indicator lamp lighting signal 133 is inputted in the power saving mode, it is at less than 3.5 V so that the wake-up signal cannot be detected, and thus, the power saving mode is maintained.

Accordingly, when the low beam lamp lighting signal 111 is inputted, the MICOM 150 is switched from the power saving mode to the activation mode, and accordingly, when the high beam lamp lighting signal 113 is inputted while the low beam lamp 117 is turned on, the MICOM 150 turns on the high beam lamp 117.

At this time, the input voltage inputted to the MICOM 150 is 5.3 V, which is the third voltage 650, and may still be in the activation mode.

When the vehicle width lamp lighting signal 121 is inputted, the MICOM 150 is switched from the power saving mode to the activation mode, and accordingly, when the smart cornering lamp lighting signal 123 is inputted while the vehicle width lamp 125 is turned on, the MICOM 150 may turn on the smart cornering lamp 127.

At this time, the input voltage inputted to the MICOM 150 is 5.3 V, which is the third voltage 650, and may still be in the activation mode.

When the daytime headlight lamp lighting signal 131 is inputted, the MICOM 150 is switched from the power saving mode to the activation mode, and accordingly, when the turn signal lamp 133 is inputted while the daytime headlight lamp 135 is turned on, the MICOM 150 may turn on the turn indicator lamp 137.

Meanwhile, when the turn indicator lamp 137 is turned on, the daytime headlight lamp 135 may be turned off.

Therefore, in relation to the input voltage to the MICOM 150, only 1.2 V, which is the first voltage, is inputted so that it can be switched to the power saving mode. However, because the daytime headlight lamp lighting signal 135 is turned off, if the daytime headlight lamp lighting signal 135 is inputted to the MICOM 150 again, it can be switched to the activation mode, so the operation of the MICOM 150 is not affected.

Figure 7:
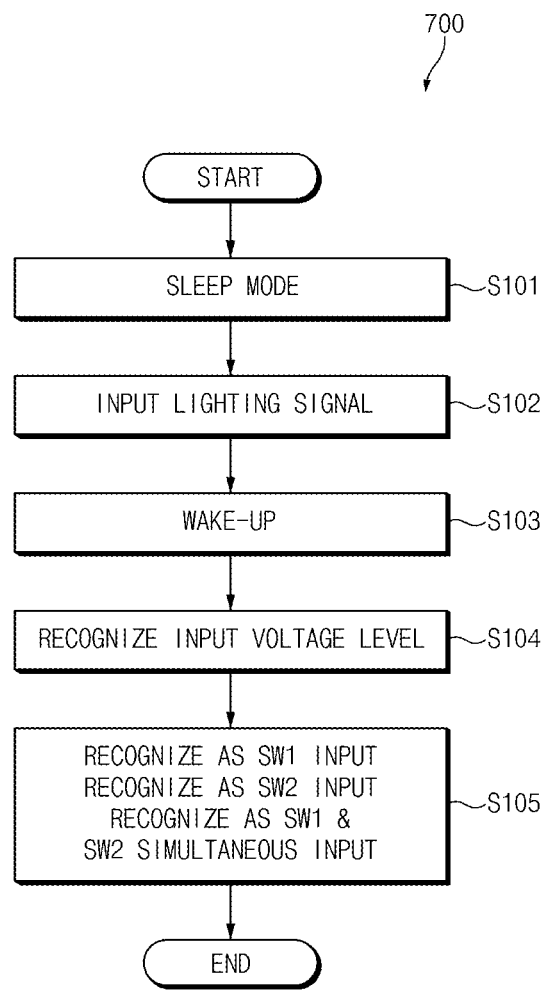
FIG. 7 is a flowchart illustrating an input lighting signal optimization method according to an embodiment of the present invention.
Figure 8:
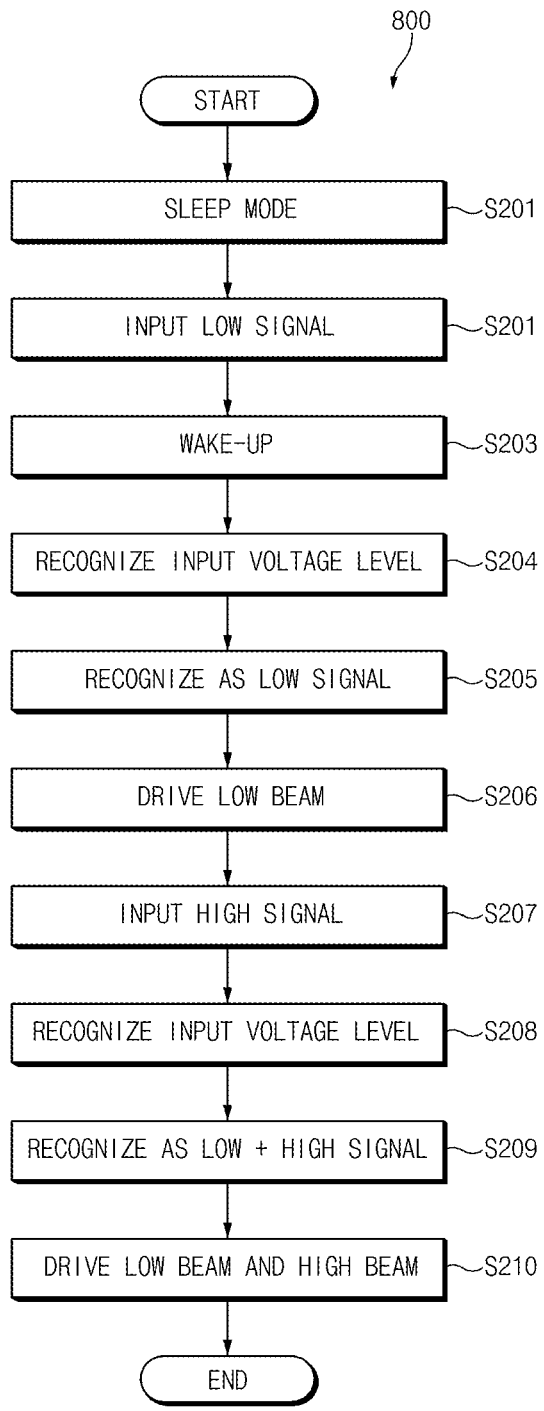
FIGS. 8, 9, and 10 are flowcharts illustrating a multiplexing process in an input lighting signal optimization method according to an embodiment of the present invention.
Figure 9:
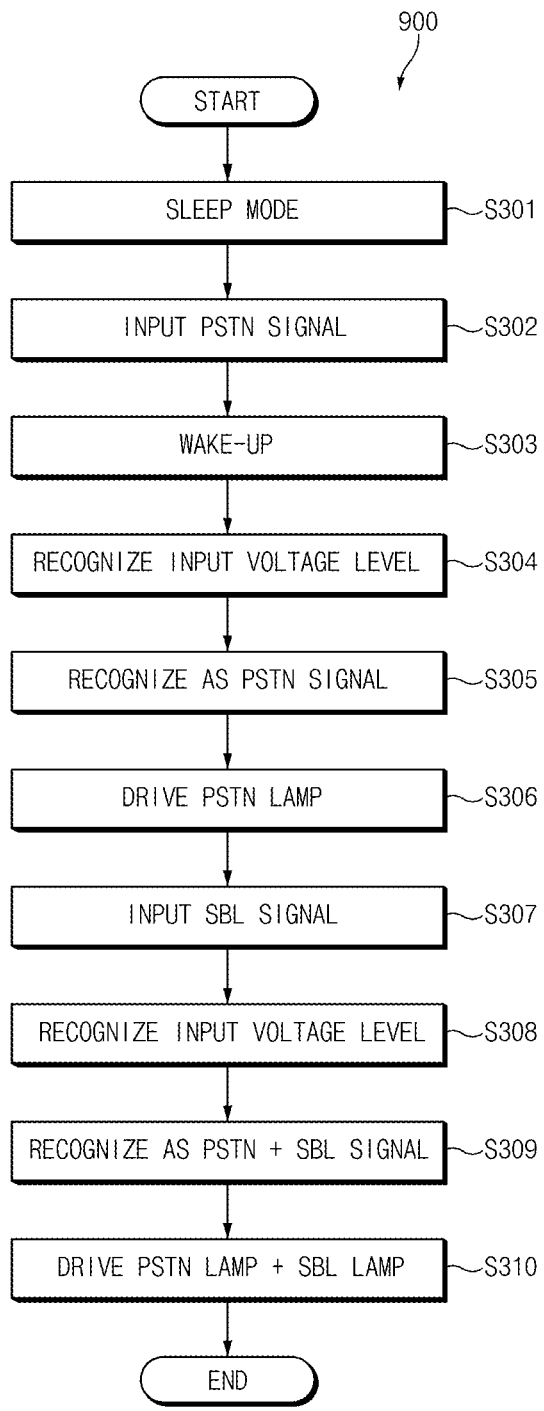
Figure 10:
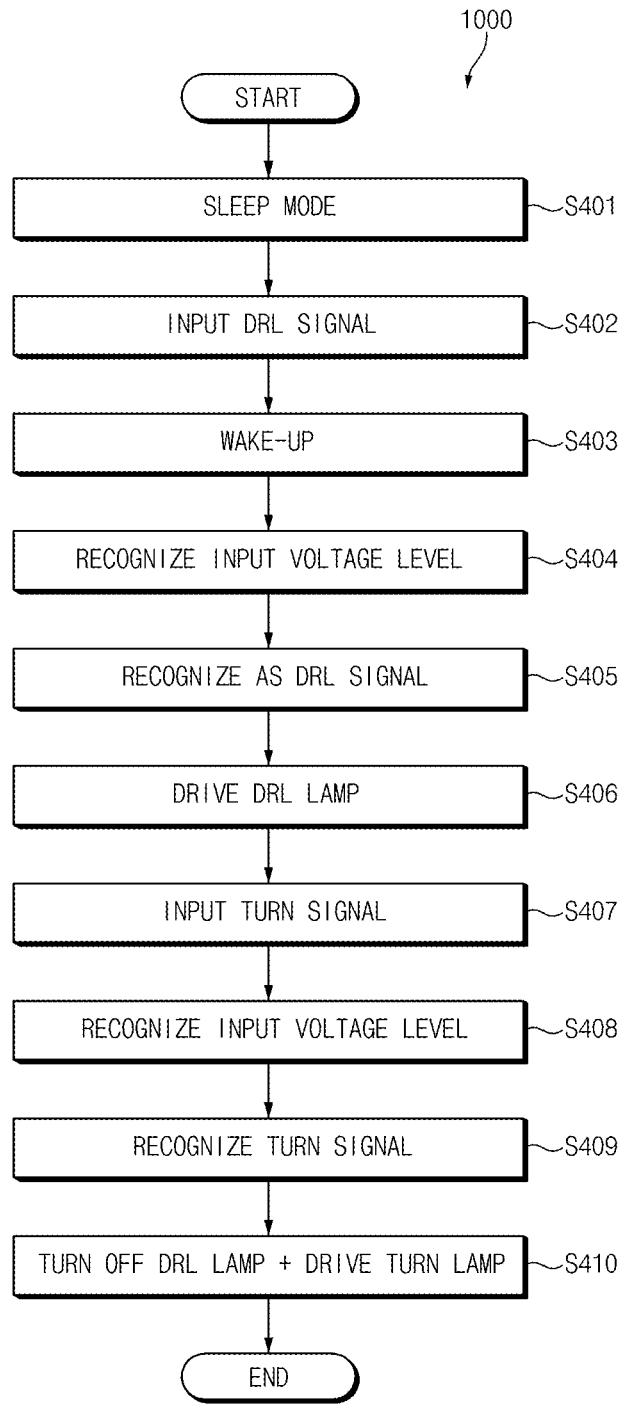

Hereinafter, an input lighting signal optimization method according to another embodiment of the present invention will be described in detail with reference to FIGS. 7 to 10. FIG. 7 illustrates a flowchart of the input lighting signal optimization method 700 according to an embodiment of the present invention. FIGS. 8 to 10 illustrate flowcharts 800, 900, and 1000 of a multiplexing process in an input lighting signal optimization method according to an embodiment of the present invention.

Hereinafter, it is assumed that the input lighting signal optimization device 100 of FIG. 1 performs the processes of FIGS. 7 to 10.

First as illustrated in FIG. 7, if no output signal is inputted to an input port for a predetermined period of time, the MICOM 150 receiving the output signal of a multiplex circuit selecting and outputting the first LED lamp lighting signal or the second LED lamp lighting signal through one input port may operate in a power saving mode (S101).

At this time, the MICOM 150 can maintain the input port to be in an activation state to detect the wake-up signal, and the first LED lamp lighting signal may be inputted with a voltage higher than the wake-up threshold, or the second LED lamp lighting signal may be inputted with a voltage lower than the wake-up threshold.

Subsequently, a lighting signal that is an output signal of the multiplex circuit is inputted to the input port of the MICOM 150 (S102), and the MICOM 150 can detect and activate a wake-up signal from the output signal of the multiplex circuit (S103).

Subsequently, after converting the analog signal, which is the output signal of the multiplex circuit inputted to the input port of the MICOM 150, into a digital signal to recognize the voltage level (S104), as a function determined for each voltage level, a driving signal configured to drive the first LED lamp or the second LED lamp or simultaneously drive the first LED lamp and the second LED lamp may be outputted (S105).

As illustrated in FIG. 8, in the case where the low beam lamp lighting signal 111 and the high beam lamp lighting signal 113 are inputted to the multiplex circuit, if the output signal of the multiplex circuit is not inputted to the first input port 110 for a predetermined period of time, first, the MICOM 150 receiving the output signal of the multiplex circuit that selects and outputs the low beam lamp lighting signal 111 or the high beam lamp lighting signal 113 through the first input port 110 may operate in a power saving mode (S201).

Subsequently, a low beam lamp lighting signal 111, which is an output signal of the multiplex circuit, may be inputted to the first input port 110 of the MICOM 150 (S202), and the MICOM 150 may detect and activate a wake-up signal from the output signal of the multiplex circuit (S203).

Subsequently, after recognizing the output signal voltage level of the multiplex circuit inputted to the first input port 110 (S204) and recognizing the low beam lamp lighting signal 111 (S205), the MICOM 150 drives the low beam lamp 115 (S206).

Subsequently, when the high beam lamp lighting signal 113 is inputted while the low beam lamp 115 is lit (S207), after recognizing the output signal voltage level of the multiplex circuit inputted to the first input port 110 (S208), when recognized as a high beam lamp lighting signal 113 (S209), the MICOM 150 may drive the high beam lamp 117 (S210).

As illustrated in FIG. 9, in the case where the vehicle width lamp lighting signal 121 and the smart cornering lamp lighting signal 123 are inputted to the multiplex circuit, if the output signal of the multiplex circuit is not inputted to the second input port 120 for a predetermined period of time, first, the MICOM 150 receiving the output signal of the multiplex circuit that selects and outputs the vehicle width lamp lighting signal 121 or the smart cornering lamp lighting signal 123 to the second input port 120 operates in a power saving mode (S301).

Subsequently, the vehicle width lamp lighting signal 121, which is an output signal of the multiplex circuit, may be inputted to the second input port 120 of the MICOM 150 (S302), and the MICOM 150 may detect and activate a wake-up signal from the output signal of the multiplex circuit (S303).

Subsequently, after recognizing the output signal voltage level of the multiplex circuit inputted to the second input port 120 (S304), when recognizing the vehicle width lamp lighting signal 121 (S305), the MICOM 150 drives the vehicle width lamp 125 (S306).

Subsequently, when the smart cornering lamp lighting signal 123 is inputted while the vehicle width lamp 125 is turned on (S307), after recognizing the output signal voltage level of the multiplex circuit inputted to the second input port 120 (S308), and recognizing the smart cornering lamp lighting signal 123 (S309), the MICOM 150 may drive the smart cornering lamp 127 (S310).

As illustrated in FIG. 10, in the case where the daytime headlight lamp lighting signal 131 and the turn indicator lamp lighting signal 133 are inputted to the multiplex circuit, if the output signal of the multiplex circuit is not inputted to the third input port 130 for a predetermined period of time, first, the MICOM 150 receiving the output signal of the multiplex circuit that selects and outputs the daytime headlight lamp lighting signal 131 or the turn indicator lamp lighting signal 133 to the third input port 130 operates in a power saving mode (S401).

Subsequently, a daytime headlight lamp lighting signal 131, which is an output signal of the multiplex circuit, is inputted to the third input port 130 of the MICOM 150 (S402), and the MICOM 150 may detect and activate a wake-up signal from the output signal of the multiplex circuit (S403).

Subsequently, after recognizing the output signal voltage level of the multiplex circuit input to the third input port 130 (S404), when recognizing the daytime headlight lamp lighting signal 131 (S405), the MICOM 150 drives the daytime headlight lamp 135 (S406).

Subsequently, when the turn indicator lamp lighting signal 133 is inputted while the daytime headlight lamp 135 is lit (S407), after recognizing the output signal voltage level of the multiplex circuit inputted to the third input port 130 (S408), when recognizing the turn indicator lamp lighting signal 133 (S409), the MICOM 150 may turn off the daytime headlight lamp 135 and drive the turn indicator lamp 137 (S410).

According to the input lighting signal optimization device 100 and method as described above, by optimizing a plurality of lighting signals configured to drive a vehicle lamp and reducing the number of input ports of the MICOM, which is a controller, even with a small package MICOM, it is possible to process a plurality of lighting signals, thereby reducing manufacturing costs.

Furthermore, the input lighting signal optimization method according to operations S101 to S105, operations S201 to S210, operations S301 to S310, and operations S401 to S410 according to the present invention is programmed to be stored in a recording medium for computer to read.

This technology may process a plurality of lighting signals even with a MICOM in a small package by optimizing a plurality of lighting signals configured to drive a vehicle lamp and reducing the number of input ports of the controller MICOM so that it is possible to reduce the manufacturing cost.

Besides that, various effects identified directly or indirectly through this specification may be provided.

The above description is merely illustrative of the technical idea of the present invention, and those skilled in the art to which the present invention pertains will be able to make various modifications and variations without departing from the essential characteristics of the present invention.

Therefore, the embodiments disclosed in the present invention are not intended to limit the technical spirit of the present invention, but to explain, and the scope of the technical spirit of the present invention is not limited by these embodiments. The scope of protection of the present invention should be construed according to the following claims, and all technical ideas falling within the scope of the same shall be construed as falling within the scope of the present invention.

What is claimed is:

1. An input lighting signal optimization device comprising:
   a multiplex circuit configured to select and output a first LED lamp lighting signal or a second LED lamp lighting signal; and
   a MICOM configured to output a driving signal configured to drive a first LED lamp or a second LED lamp after receiving an output signal of the multiplex circuit through an input port and detect a wake-up signal included in the output signal of the multiplex circuit to switch to an activation mode,
   wherein the MICOM is a driving operation of outputting a driving signal configured to drive the first LED lamp or the second LED lamp as a function determined for each voltage level after recognizing a voltage level of the output signal inputted to the input port.

2. The input lighting signal optimization device of claim 1, wherein the multiplex circuit comprises:
   a voltage driver circuit that converts an input voltage to a desired output voltage using a resistor.

3. The input lighting signal optimization device of claim 1, wherein the input port performs an ADC operation configured to convert an analog signal to a digital signal,
   wherein the MICOM is configured to detect an input voltage converted through the ADC operation and perform a function determined for a plurality of voltage levels.

4. The input lighting signal optimization device of claim 1, wherein if the output signal of the multiplex circuit is not inputted to the input port for a predetermined period of time, the MICOM operates in a power saving mode and maintains the input port to be in an active state to detect the wake-up signal in the power saving mode.

5. The input lighting signal optimization device of claim 1, wherein the first LED lamp lighting signal is inputted with a voltage higher than a wake-up threshold, and the second LED lamp lighting signal is inputted with a voltage lower than the wake-up threshold.

6. The input lighting signal optimization device of claim 5, wherein the first LED lamp lighting signal comprises:
   a low beam lamp lighting signal, a vehicle width lamp lighting signal or a daytime headlight lamp lighting signal.

7. The input lighting signal optimization device of claim 6, wherein the MICOM drives the low beam lamp, the vehicle width lamp or the daytime headlight lamp through the first LED lamp lighting signal.

8. The input lighting signal optimization device of claim 7, wherein the second LED lamp lighting signal comprises:
   a high beam lamp lighting signal, a smart cornering lamp lighting signal or a turn indicator lamp lighting signal.

9. The input lighting signal optimization device of claim 8,
   wherein the MICOM turns on the high beam lamp when the high beam lamp lighting signal is inputted while the low beam lamp is turned on,
   wherein the MICOM turns on the smart cornering lamp when the smart cornering lamp lighting signal is inputted while the vehicle width lamp is turned on, and
   wherein the MICOM turns off the daytime headlight lamp and turns on the turn indicator lamp when the turn indicator lamp lighting signal is inputted while the daytime headlight lamp is turned on.

10. An input lighting signal optimization method comprising:
    a power saving mode in which a MICOM receiving an output signal of a multiplex circuit configured to select and output a first LED lamp lighting signal or a second LED lamp lighting signal through one input port operates in a power saving mode if the output signal is not inputted to the input port for a predetermined period of time;
    a wake-up operation of detecting a wake-up signal from the output signal inputted to the input port and operating in an activation mode; and a driving operation of outputting a driving signal configured to drive the first LED lamp or the second LED lamp as a function determined for each voltage level after recognizing a voltage level of the output signal inputted to the input port.

11. The method of claim 10, wherein the power saving mode operation comprises:
maintaining the input port to be in an active state to detect the wake-up signal.

12. The method of claim 10, wherein the wake-up operation comprises:
inputting the first LED lamp lighting signal with a voltage higher than a wake-up threshold; and
inputting the second LED lamp lighting signal with a voltage lower than the wake-up threshold.

13. The method of claim 10, wherein the driving operation comprises:
performing an ADC operation configured to convert an analog signal to a digital signal at the input port; and
detecting, by the MICOM, the input voltage converted through the ADC operation and performing a function determined for each voltage level.

14. The method of claim 10, wherein the driving operation comprises:
driving a low beam lamp, a vehicle width lamp or a daytime headlight lamp through the first LED lamp lighting signal.

15. The method of claim 14, wherein the driving operation comprises:
turning on the high beam lamp when the high beam lamp lighting signal is inputted while the low beam lamp is turned on;
turning on the smart cornering lamp when the smart cornering lamp lighting signal is inputted while the vehicle width lamp is turned on; and
turning off the daytime headlight lamp and then turning on the turn indicator lamp when the turn indicator lamp lighting signal is inputted while the daytime headlight lamp is turned on.

16. A non-transitory computer-readable recording medium in which a program configured to execute the input lighting signal optimization method of claim 10.

* * * * *